United States Patent [19]

Pham et al.

[11] Patent Number: 4,933,420

[45] Date of Patent: Jun. 12, 1990

[54] EPOXY RESINS CONTAINING PHOSPHONIUM CATALYSTS

[75] Inventors: Ha Q. Pham, Richwood; Loan A. Ho, Lake Jackson, both of Tex.

[73] Assignee: The Dow Chemical Company, Midland, Mich.

[21] Appl. No.: 248,509

[22] Filed: Sep. 23, 1988

[51] Int. Cl.$^5$ ............................................. C08G 59/68
[52] U.S. Cl. ..................................... 528/89; 528/297; 528/361; 528/365; 525/481; 525/482; 525/485; 525/488; 525/502; 525/508; 525/534
[58] Field of Search ................ 528/89, 297, 361, 365; 525/481, 482, 485, 488, 502, 508, 534

[56] References Cited

U.S. PATENT DOCUMENTS

| | | | |
|---|---|---|---|
| 3,477,990 | 11/1969 | Dante et al. | 528/89 |
| 3,948,855 | 4/1976 | Perry | 528/89 |
| 4,093,650 | 6/1978 | Doorakian et al. | 562/602 |
| 4,132,706 | 1/1979 | Doorakian et al. | 528/89 |
| 4,171,420 | 10/1979 | Doorakian et al. | 528/89 |
| 4,171,422 | 10/1979 | Lazarus et al. | 528/437 |
| 4,177,216 | 12/1979 | Doorakian et al. | 568/11 |
| 4,192,939 | 3/1980 | Bacskai | 528/313 |
| 4,266,079 | 5/1981 | Doorakian et al. | 568/11 |
| 4,302,574 | 11/1981 | Doorakian et al. | 528/89 |
| 4,340,761 | 7/1982 | Doorakian et al. | 568/11 |
| 4,352,918 | 10/1982 | Whiteside, Jr. et al. | 528/89 |
| 4,354,015 | 10/1982 | Doorakian et al. | 528/89 |
| 4,366,295 | 12/1982 | Tyler, Jr. et al. | 525/482 |
| 4,370,465 | 1/1983 | Whiteside, Jr. et al. | 528/104 |
| 4,395,574 | 7/1983 | Doorakian et al. | 568/11 |
| 4,405,766 | 9/1983 | Bertram et al. | 525/507 |
| 4,410,496 | 10/1983 | Whiteside, Jr. et al. | 428/413 |
| 4,438,254 | 3/1984 | Doorakian et al. | 528/89 |
| 4,477,645 | 10/1984 | Doorakian et al. | 528/99 |
| 4,496,709 | 1/1985 | Doorakian et al. | 528/89 |
| 4,540,823 | 9/1985 | Doorakian et al. | 568/10 |
| 4,634,757 | 1/1987 | Marshall | 528/89 |
| 4,692,504 | 9/1987 | Frank | 528/89 |
| 4,725,652 | 2/1988 | Bertram et al. | 525/485 |

FOREIGN PATENT DOCUMENTS 1203943 4/1986 Canada.
8400171 1/1984 World Int. Prop. O.

*Primary Examiner*—John Kight, III
*Assistant Examiner*—Frederick Krass

[57] ABSTRACT

Epoxide compounds and phenolic compounds are reacted in the presence of phosphonium compounds represented by the formula $\ominus Z'R^1R^2R^3P\oplus$-Z-P$\oplus R^1R^2R^3 Z'\ominus$ wherein each $R^1$, $R^2$ and $R^3$ is independently an aromatic group or an inertly substituted aromatic group; Z is $-(C(R^4)_2)_a-$; each $R^4$ is independently hydrogen or a hydrocarbyl group containing from 1 to about 20 carbon atoms; Z' is any suitable anion and a has a value of at least 4.

18 Claims, No Drawings

EPOXY RESINS CONTAINING PHOSPHONIUM CATALYSTS

FIELD OF THE INVENTION

The present invention is directed to epoxy resins containing phosphonium catalysts and a process for reacting epoxy resins with acids and phenolic hydroxyl containing compounds.

BACKGROUND OF THE INVENTION

Epoxy resins are well known articles of commerce and are useful in many different applications. Advanced epoxy resins are prepared by reacting a low molecular weight epoxy resin with a polyhydric phenol in the presence of a catalyst. One particularly useful group of catalysts are the phosphonium catalysts as disclosed by Dante et al. in U.S. Pat. No. 3,477,990, Perry in U.S. Pat. No. 3,948,855, Tyler, Jr. et al. in U.S. Pat. No. 4,366,295 and Marshall in U.S. Pat. No. 4,634,757. In precatalyzed epoxy resin compositions, the ideal catalyst should be stable at elevated temperatures and not become deactivated during this prolonged storage. In the manufacture of advanced epoxy resins, the ideal catalyst should be sufficiently active such that the resulting product reaches its desired molecular weight or epoxide equivalent weight target value but not be so reactive at that point as to result in a product which is significantly beyond the target point as to molecular weight or epoxide equivalent weight. In other words, the catalyst should become essentially deactivated at the target point. While the catalysts of the aforementioned patents meet one or more of the above desirable characteristics of an ideal catalyst, none of them meets all of the characteristics of the ideal catalyst. It would be desirable to have a catalyst for the reaction between an epoxide compound and an acidic compound including aromatic hydroxyl containing compounds which has characteristics which meet or substantially meets the characteristics of the ideal catalyst.

SUMMARY OF THE INVENTION

The present invention pertains to a precatalyzed composition comprising a compound having at least one vicinal epoxy group per molecule and a catalyst represented by the formula

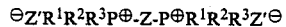

wherein each $R^1$, $R^2$ and $R^3$ is independently an aromatic group or an inertly substituted aromatic group; Z is $—(C(R^4)_2)_a—$; each $R^4$ is independently hydrogen or a hydrocarbyl group containing from 1 to about 20 carbon atoms; and Z' is any suitable anion; a has a value of at least 4; and wherein the catalyst is present in an amount of from about 0.0005 to about 50 milliequivalents per epoxide equivalent contained in the epoxy containing compound.

The present invention also pertains to a process for reacting a compound having at least one vicinal epoxy group per molecule with an acidic compound in the presence of a catalytic quantity of catalyst represented by the formula

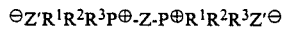

wherein each $R^1$, $R^2$ and $R^3$ is independently an aromatic group or an inertly substituted aromatic group; Z is $—(C(R^4)_2)_a—$; each $R^4$ is independently hydrogen or a hydrocarbyl group containing from 1 to about 20, more suitably from 1 to about 10, most suitably from 1 to about 4 carbon atoms; Z' is any suitable anion; and a has a value of at least 4.

DETAILED DESCRIPTION OF THE INVENTION

In the present invention, the catalyst employed is that which can be represented by the general formula

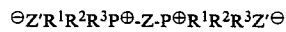

wherein each $R^1$, $R^2$ and $R^3$ is independently an aromatic group or an inertly substituted aromatic group; Z is $—(C(R^4)_2)_a—$; each $R^4$ is independently hydrogen or a hydrocarbyl group or inertly substituted hydrocarbyl group containing from 1 to about 20, more suitably from 1 to about 10, most suitably from 1 to about 4 carbon atoms; Z' is any suitable anion and a has a value of at least 4, suitably from about 4 to about 20, more suitably from about 4 to about 10, most suitably from b 4 to about 6.

The term hydrocarbyl as employed herein means any aliphatic, cycloaliphatic, aromatic, aryl substituted aliphatic or cycloaliphatic, or aliphatic or cycloaliphatic substituted aromatic groups. The aliphatic groups can be saturated or unsaturated. The term inert substituted hydrocarbyl group means that the hydrocarbyl group can contain one or more substitutent groups that does not enter into the reaction and does not interfere with the reaction between the epoxy compound and the compound with which it is being reacted. Suitable such inert groups include, for example, $—CO—Cl—C\equiv N$, $—OH$ and the like.

Suitable anions include, for example, any of those described by Dante et al. in U.S. Pat. No. 3,477,990, by Perry in U.S. Pat. No. 3,948,855, by Tyler, Jr. et al. in U.S. Pat. No. 4,366,295 and by Marshall in U.S. Pat. No. 4,634,757, all of which are incorporated herein by reference in their entirety. Particularly suitable anions include the halides such as, for example, chloride, bromide, iodide and the like and the carboxylates as well as the carboxylic acid complexes thereof, such as formate, acetate, propionate, oxalate, trifluoroacetate, formate.-formic acid complex, acetate.acetic acid complex, propionate.propionic acid complex, oxalate.oxalic acid complex, trifluoroacetate.trifluoroacetic acid complex, and the like. Also suitable anions include, for example, phosphate, and the conjugate bases of inorganic acids, such as, for example, bicarbonate, phosphate, tetrafluoroborate or biphosphate and conjugate bases of phenol, such as, for example, phenate or an anion derived from bisphenol A.

Some of these catalysts are commercially available; however those which are not can be readily prepared by the method described by Marshall in the aforementioned U.S. Pat. No. 4,634,757 already incorporated by reference. However, the appropriate substitute in the dihalide which is reacted with the phosphine is to be employed instead of the methylene bromide employed by Marshall. Particularly suitable such catalyst include, for example, tetramethylene bis(triphenyl phosphonium chloride), tetramethylene bis(triphenyl phosphonium iodide), tetramethylene bis(triphenyl phosphonium bromide), pentamethylene bis(triphenyl phosphonium chloride), pentamethylene bis(triphenyl phosphonium iodide), pentamethylene bis(triphenyl phosphonium bromide), hexamethylene bis(triphenyl phosphonium iodide), hexamethylene bis(triphenyl phosphonium bromide), heptamethylene bis(triphenyl phosphonium chloride), heptamethylene bis(triphenyl phosphonium iodide), heptamethylene bis(triphenyl phosphonium bromide), tetramethylene bis(triphenyl phosphonium acetate.acetic acid complex), pentamethylene bis(triphenyl phosphonium acetate.acetic acid complex), hexamethylene bis(triphenyl phosphonium acetate.acetic acid complex), heptamethylene bis(triphenyl phosphonium acetate.acetic acid complex), tetramethylene bis(triphenyl phosphonium phosphate), pentamethylene bis(triphenyl phosphonium phosphate), hexamethylene bis(triphenyl phosphonium phosphate), heptamethylene bis(triphenyl phosphonium phosphate), tetramethylene bis(triphenyl phosphonium)bicarbonate, pentamethylene bis(triphenyl phosphonium)bicarbonate, hexamethylene bis(triphenyl phosphonium)bicarbonate, heptamethylene bis(triphenyl phosphonium)bicarbonate, tetramethylene bis(triphenyl phosphonium)oxalate, pentamethylene bis(triphenyl phosphonium)oxalate, hexamethylene bis(triphenyl phosphonium)oxalate heptamethylene bis(triphenyl phosphonium)oxalate, combinations thereof and the like.

The amount of the catalyst to be employed depends upon the reactants and the products being produced. In any event, an amount sufficient to produce the desired product is employed. When one is reacting a monoepoxide with a monophenol, the amount which can suitably be employed is usually from about 0.0005 to about 50, more suitably from about 0.05 to about 30, most suitably from about 0.5 to about 10 milliequivalents of catalyst per epoxide equivalent of the epoxide compound(s). When one is preparing an advanced epoxy resin by reacting a dihydric phenol with a diepoxide, an amount of catalyst corresponding to from about 0.0005 to about 50, more suitably from about 0.005 to about 30, most suitably from about 0.5 to 10 milliequivalents of catalyst per epoxide equivalent of the epoxide compound(s) is employed. In the precatalyzed composition comprising the polyepoxide and the catalyst, the amount of catalyst is usually from about 0.0005 to about 50, more suitably from about 0.05 to about 30, most suitably from about 0.5 to about 10 milliequivalents of catalyst per epoxide equivalent of the epoxide compound(s).

The catalyst can be employed neat or in a solvent which is compatible with the epoxy compound. Particularly suitable such solvents include, for example, alcohols such as, for example, methanol, ethanol, propanol, glycol ethers such as, for example, ethylene glycol methyl ether, ethylene glycol n-butyl ether, propylene glycol methyl ether, combinations thereof and the like.

Any vicinal mono- or polyepoxide-containing compounds can be employed herein including the aromatic or aliphatic based mono- and polyepoxides. Any of the epoxide materials disclosed in the aforementioned U.S. Patents to Dante et al., Perry, Tyler, Jr. et al. and Marshall can also be employed herein. Suitable monoepoxides which can be employed herein include, for example, the alkylene oxides such as, for example, ethylene oxide, propylene oxide, butylene oxide, the epichlorohydrins such as for example, epichlorohydrin, epibromohydrin, epiiodohydrin, and the like. Also suitable monoepoxides which can be employed are the glycidyl ethers of aliphatic and aromatic alcohols, such as, for example, butyl glycidyl ether, phenyl glycidyl ether and the like. Suitable polyepoxides which can be employed herein include, the diglycidyl ethers of the dihydroxy phenols, such as, for example, resorcinol, catechol and hydroquinone, the diglycidyl ethers of biphenol and bisphenols such as, for example, bisphenol A, bisphenol F, bisphenol K, bisphenol S, as well as the alkyl and halogen derivatives thereof such as the $C_1$ to $C_4$ alkyl, chlorine or bromine derivatives. Also suitable are the polyglycidyl ethers of the novolac resins prepared by reacting a phenol or alkyl or halogen substituted phenol with an aldehyde such as formaldehyde. Suitable also are the polyglycidyl ethers of the adducts of alkadiene or oligomers of alkadienes such as cyclopentadiene and dicylcopentadiene with a phenol or substituted phenol. These are disclosed by Nelson in U.S. Pat. No. 4,390,680 which is incorporated herein by reference in its entirety. Mixtures of any of the epoxide containing compounds can be employed. Preferably, the epoxide containing compounds are the diglycidyl ethers of dihydroxyl containing compounds represented by the following formula

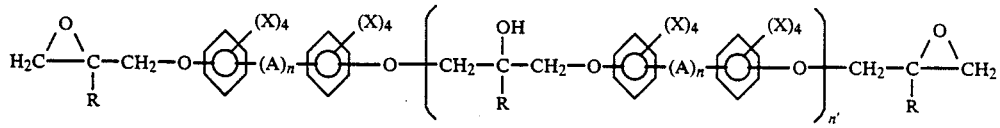

wherein A is a divalent hydrocarbyl group having from 1 to about 12, more suitably from about 1 to about 8, most suitably from 1 to about 4 carbon atoms; each R is independently hydrogen or an alkyl group having from 1 to about 4 carbon atoms, preferably hydrogen or methyl, most preferably hydrogen; each X is independently hydrogen or a hydrocarbyl or hydrocarbyloxy group having from 1 to about 12, more suitably from 1 to about 6, most suitably from 1 to about 4, carbon atoms or a halogen, preferably chlorine or bromine; n has a value of zero or 1 and n' has a value from zero to about 0.5, more suitably from about 0.035 to about 0.25, most suitably from about 0.03 to about 0.1.

Suitable acidic compounds which can be employed herein include, for example, carboxylic acids, anhydrides of carboxylic acids and aromatic hydroxyl-containing compounds as disclosed by the aforementioned Marshall in U.S. Pat. No. 4,634,757 which has been incorporated herein by reference. The acids and anhydrides can be unsaturated, saturated, aliphatic, cycloaliphatic, aromatic or heterocyclic. Suitable such acids include, for example, succinic acid, glutaric acid, adipic acid, pimelic acid, suberic acid, azelaic acid, sebacic acid, oxalic acid, abietic acid, maleic acid, aconitic acid, chlorendic acid, phthalic acid, combinations thereof and the like.

Suitable anhydrides include, for example, those which possess at least one anhydride group, i.e., a —CO—O—CO— group. Particularly suitable such anhydrides include, for example, phthalic anhydride, isophthalic anhydride, di-, tri-, tetra- and hexahydrophthalic anhydride, 3,4,5,6,7,7-hexachloro-3,6- endomethylene-1,2-tetrahydrophthalic hydride (chlorendic anhydride), succinic anhydride, maleic anhydride, maleic anhydride, chlorosuccinic anhydride, monochloromaleic anhydride, 6-ethyl-4-cyclohexene-1,2-dicarboxylic acid anhydride, 3,6-dimethyl-4-cyclohexene-1,2-dicarboxylic acid anhydride, 6-butyl-3,5-cyclohexadiene-1,2-dicarboxylic acid anhydride, octadecylsuccinic acid anhydride, dodecylsuccinic acid anhydride, dioctylsuccinic acid anhydride, nonadecadienylsuccinic acid anhydride, adducts of maleic anhydride with polyunsaturates such as methylcyclopentadiene (Nadic methyl anhydride) 3-butoxy-1,2,3,6-tetrahydrophthalic acid anhydride, trimellitic acid anhydride, pyromellitic acid anhydride, di-, tetra-, and hexahydropyromellitic acid anhydride, polyadipic acid anhydride, polysebacic acid anhydride, combinations thereof and the like. Derivatives of the anhydrides, such as their partial esters, amides, and the like can also be employed. Examples of such derivatives are esters of glycols and pyromellitic acid anhydride, and partial esters of trimellitic acid anhydride and the like.

Particularly suitable aromatic hydroxyl-containing compounds which can be employed herein include monophenols or polyphenols or the alkyl or halogen substituted derivatives thereof. Suitable monophenols include, for example, phenol, o-, m- and p-cresol, chlorophenol, bromophenol, nitrophenol, and the like. Suitable compounds containing two aromatic hydroxyl groups per molecule such as, for example, catechol, resorcinol, hydroquinone, biphenol, bisphenol A, bisphenol F, bisphenol K, bisphenol S, and the like. Suitable compounds having more than one aromatic hydroxyl group per molecule which can be employed herein include, for example, the novolac resins which are the acid catalyzed reaction product of a phenol or an alkyl or halogen substituted phenol and an aldehyde, particularly formaldehyde. These novolac resins have an average of from about 1.01 to about 8, more suitably from about 1.01 to about 6, most suitably from about 1.01 to about 4 aromatic hydroxyl groups per molecule. Also suitable are the alkyl and halogen, particularly chlorine and bromine, derivatives of these novolac resins. Suitable also are the adducts of alkadiene or oligomers of alkadienes such as cyclopentadiene and dicyclopentadiene with a phenol or substituted phenol. These are disclosed by Nelson in U.S. Pat. No. 4,390,680 which is incorporated herein by reference in its entirety. Any of the aromatic hydroxyl containing compounds disclosed in the aforementioned patents to Dante et al, Perry, Tyler, Jr. and Marshall can suitably be employed herein. The preferred aromatic hydroxyl containing compounds are those represented by the following formula

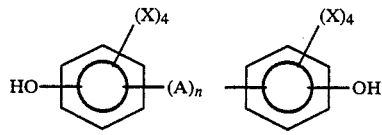

wherein A is a divalent hydrocarbyl group having from 1 to about 12, more suitably from about 1 to about 8, most suitably from 1 to about 4 carbon atoms; each X is independently hydrogen, halogen, particularly chlorine or bromine, or an alkyl group having from 1 to about 6, more suitably from 1 to about 4 carbon atoms; and n has a value of zero or 1.

In the reaction between the phenolic hydroxyl containing compound and the epoxide containing compounds, the reactants can be employed over a wide range from stoichiometric quantities to an excess of the phenolic compound to an excess of the epoxide compound. The particular amount depends upon the reactants themselves and the type of product desired. If it is desired to prepare large molecular weight materials from diepoxides and diphenols then a stoichiometric quantity, i.e. one phenolic hydroxyl group per epoxide group, of each of the compounds is employed. If it is desirable to have a product which is terminated in phenolic hydroxy groups, then an excess of the phenolic compound is employed. If is desirable to prepare a product which is terminated in epoxide groups, then an excess of the epoxide containing compound is employed. In the preferred embodiment of preparing advanced epoxy resins from diepoxy compounds and diphenols, the reactants are employed in amounts which provide a ratio of phenolic hydroxyl groups per epoxide group of from about 0.2:1 to about 2:1, more suitably from about 0.4:1 to about 1.5:1, most suitably from about 0.6:1 to about 1:1.

The reaction between the phenolic hydroxyl containing compounds and the epoxide containing compounds can be conducted in the presence or absence of solvents or diluents. If solvents or diluents are desired to be employed, suitable such solvents or diluents include, for example, aromatic and aliphatic hydrocarbons such as, for example, pentane, hexane, heptane, octane, nonane, decane, benzene, toluene, xylene, and the like, alcohols such as, for example, methanol, ethanol, isopropyl alcohol, butanol, and the like, glycol ethers such as, for example, butylene glycol methyl ether, diethylene glycol n-butyl ether, diethylene glycol ethyl ether, diethylene glycol methyl ether, dipropylene glycol methyl ether ethylene glycol n-butyl ether, ethylene glycol ethyl ether, ethylene glycol methyl ether, ethylene glycol phenyl ether, propylene glycol phenyl ether, propylene glycol methyl ether, tripropylene glycol methyl ether, and the like, amides such as, for example, dimethyl formamide and the like, sulfoxides such as, for example, dimethyl sulfoxide and the like. Mixtures of any of the solvents in any combination can be employed, if desired.

The reaction between the phenolic hydroxyl containing compound and the epoxide containing compound can be conducted at temperatures from about 40° C. to about 280° C. suitably from about 100° C. to about 240° C. more suitably from about 120° C. to about 230° C. most suitably from about 130° C. to about 220° C. The reaction can be conducted at any practical pressure which can be subatmospheric to superatmospheric pressure. Usually the reaction is conducted at pressures of from about 1 psig to about 150 psig, more suitably from about 5 psig to about 80 psig, most suitably from about 10 psig to about 20 psig.

The epoxy resins produced by the process of the present invention are useful in all of the applications for which epoxy resins are known such as, for example, castings, coatings, laminates, composites, encapsulants, and the like.

EXAMPLES 1-2 and COMPARATIVE EXPERIMENTS A-G (Preparation of Advanced Epoxy Resins)

A series of advanced epoxy resins are prepared by the following procedure employing different catalysts.

Into a 1-liter, 5-necked glass reactor equipped with a mechanical stirrer, a thermometer connected to a temperature controller and heating mantle, is charged 395.9 gms (2.075 equivalents) of a diglycidyl ether of bisphenol A liquid epoxy resin having an epoxide equivalent weight (EEW) of 190.8. The reactor is purged with nitrogen and the resin warmed to 80° C. Bisphenol A, 204.1 gms (1.790 equivalents), is then added and mixed for 15 minutes at 80° C. The indicated catalyst in the indicated quantity is added to the resin/bisphenol A slurry and the temperature is gradually increased to 150° C. over a 45 minute period. Heating is turned off at 150° C. and an exotherm is allowed to take place to 190° C. to 200° C. Air cooling is used to control the exotherm temperature to less than 200° C. The cook temperature is maintained at 190° C. to 200° C. for 4 hours while samples are taken for product analyses. After reacting for 4 hours, the resin is poured out and flaked on aluminum foil. The catalyst, catalyst quantities and results are given in Tables I and II.

Comparative analysis results are shown in Table I and catalyst activity data are shown in Table II.

TABLE I
COMPARATIVE PRODUCT PROPERTIES

| Ex. or Comp. Expt. | CATALYST | Amount of Catalyst (milli-equiv.) | EEW | % OF TARGET EEW[a] | VISCOSITY cps (pa.s) | WEIGHT AVERAGE MOLECULAR WEIGHT | Mw/Mn |
|---|---|---|---|---|---|---|---|
| 1 | tetramethylene bis (TPhPBr[b]) | 0.57 | 2,161 | 102.9 | 18,000 (18) | 16,226 | 3.56 |
| 2 | pentamethylene bis (TPhPBr[b]) | 0.57 | 2,139 | 101.9 | 16,500 (16.5) | 15,043 | 3.30 |
| A* | methylene bis (TPhPBr[b]) | 0.57 | 2,302 | 109.6 | 30,000 (30) | 19,154 | 3.80 |
| B* | ethylene bis (TPhPBr[b]) | 0.57 | 1,896 | 90.3 | 7,000 (7) | 11,039 | 2.92 |
| C* | trimethylene bis (TPhPBr[b]) | 0.57 | 2,063 | 98.2 | 11,000 (11) | 13,066 | 3.12 |
| D* | 1,4-butene bis (TPhPCl[c]) | 0.57 | 1,933 | 92.0 | 7,500 (7.5) | 11,162 | 2.88 |
| E* | 1,2-vinylene bis (TPhPBr[b]) | 0.57 | 1,977 | 94.1 | 8,500 (8.5) | 11,987 | 3.01 |
| F* | p-xylylene bis (TPhPBr[b]) | 0.57 | 1,853 | 88.2 | 5,000 (5) | 10,125 | 2.82 |
| G* | ethyl TPhPBr[b] | 0.57 | 2,058 | 98.0 | 13,000 (13) | 13,218 | 3.17 |

*Not an Example of the Present invention
[a] The target EEW is 2,100.
[b] TPhPBr is triphenyl phosphonium bromide.
[c] TPhPBr is triphenyl phosphonium chloride.

TABLE II
CATALYST ACTIVITY

| Ex. or Comp. Expt. | CATALYST | % ACTIVE CATALYST AT INDICATED MINUTES AFTER EXOTHERM | | | | | |
|---|---|---|---|---|---|---|---|
| | | 5 | 30 | 60 | 120 | 180 | 240 |
| 1 | tetramethylene bis (TPhPBr[a]) | 77 | 65 | 48 | 30 | 21 | 16 |
| 2 | pentamethylene bis (TPhPBr[a]) | 70 | 61 | 48 | 34 | 20 | ND[c] |
| A* | methylene bis (TPhPBr[a]) | 69 | 67 | 64 | 64 | 56 | 53 |
| B* | ethylene bis (TPhPBr[a]) | 43 | 25 | 16 | ND[c] | ND[c] | ND[c] |
| C* | trimethylene bis (TPhPBr[a]) | 53 | 35 | 23 | ND[c] | ND[c] | ND[c] |
| D* | 1,4-butene bis (TPhPCl[b]) | 46 | 30 | 16 | ND[c] | ND[c] | ND[c] |
| E* | 1,2-vinylene bis (TPhPBr[a]) | 71 | 43 | 27 | 18 | ND[c] | ND[c] |
| F* | p-xylylene bis (TPhPBr[a]) | 34 | 25 | ND[c] | ND[c] | ND[c] | ND[c] |
| G* | ethyl TPhPBr[a] | 78 | 30 | 13 | ND[c] | ND[c] | ND[c] |

*Not an Example of the Present invention.
[a] TPhPBr is triphenyl phosphonium bromide.
[b] TPhPBr is triphenyl phosphonium chloride.
[c] ND is not detectable.

The data shows that tetramethylene bis triphenyl phosphonium bromide and pentamethylene bis triphenyl phosphonium bromide are superior catalysts, as compared to a conventional catalyst such as ethyl triphenyl phosphonium bromide. The two catalysts remained active throughout the reaction and became deactivated only at the end of the reaction, whereas ethyl triphenyl phosphonium bromide is deactivated after only one hour, resulting in an incomplete reaction, lower viscosity, and lower molecular weight products. Methylene bis triphenyl phosphonium catalyst did not become deactivated and continued to build high viscosity and high molecular weight and thus is not suitable for resin advancement. Other evaluated bisphosphonium catalysts showed very poor reactivity and produced very low viscosity, low MW products.

EXAMPLES 3-4 and COMPARATIVE EXPERIMENTS H-I (Pre-Catalyzed Resin Comparison)

A series of precatalyzed epoxy resins are prepared by the following procedure employing different catalysts.

Into a 4 oz. glass bottle is weighed 96.0 gms (0.531 epoxy equiv.) of a liquid diglycidyl ether of bisphenol A having an EEW of 180.7 and 4 gms of xylene. After the epoxy resin/xylene mixture is thoroughly agitated, the indicated catalyst in the indicated amount is added to the mixture. The pre-catalyzed epoxy resin mixture is then agitated using a mechanical mixer and subjected to heat aging in a convection oven controlled at 90° C. The catalytic activity of the catalyst remaining after heat aging over a period of time is reported in Table III.

TABLE III

| Ex. or Comp. Expt. | CATALYST | Catalyst (milli-equiv.) | % ACTIVE CATALYST AT 90° C. AFTER THE INDICATED TIME | | | | |
|---|---|---|---|---|---|---|---|
| | | | 0 hr | 6 hrs | 24 hrs | 48 hrs | 72 hrs |
| 3 | tetramethylene bis (TPhPBr$^a$) | | 100 | 86 | 69 | 61 | 56 |
| 4 | tetramethylene bis (TPhPP$^b$) | | 100 | 98 | 92 | 81 | 79 |
| H* | EtTPhP Acetate.HAc$^c$ | | 100 | 40 | 10 | 8 | 7 |
| I* | EtTPhP$^d$ Iodide | | 100 | 87 | 59 | 41 | 30 |

*Not an example of the present invention.
$^a$TPhPBr is triphenyl phosphonium bromide. The catalyst is employed as a 16.5% solution in methanol in an amount which provides 0.45 milliequivalent of catalyst.
$^b$TPhPP is triphenyl phosphonium phosphate. The catalyst is employed as a 30% solution in methanol in an amount which provides 0.45 milliequivalent of catalyst.
$^c$EtTPhP.HAc is ethyltriphenyl phosphonium acetate.acetic acid complex. The catalyst is employed as a 70% solution in methanol in an amount which provides 0.45 milliequivalent of catalyst.
$^d$EtTPhP is ethyltriphenyl phosphonium. The catalyst is employed as a 30% solution in methanol in an amount which provides 0.45 milliequivalent of catalyst.

The pre-catalyzed resin data shows that tetramethylene bis triphenyl phosphonium salts are superior catalysts for uses in pre-catalyzed epoxy resin compositions. The shelf-life of the pre-catalyzed resins is significantly improved.

EXAMPLE 5

The procedure of Example 1 is employed except that 350 gms (1.937 equiv.) of a diglycidyl ether of bisphenol A having an EEW of 180.7; 202.8 g (1.779 equiv.) of bisphenol A and 0.32 gms (0.86 milliequiv.) of tetramethylene bis(triphenyl phosphonium bromide) are employed. Heating is applied to raise the temperature gradually to 150° C. and the exotherm temperature is 215° C. The cook temperature is also kept at 215° C. for 4 hours. The product analyses are shown in Table IV.

COMPARATIVE EXPERIMENT J

The procedure of Example 5 is followed except that 0.30 g (0.86 milliequiv.) of methylene bis (triphenyl phosphonium bromide) is employed as the catalyst. The reaction mixture became extremely viscous at 1.5 hrs. after exotherm and the reaction is terminated. Product analyses are shown in Table IV.

COMPARATIVE EXPERIMENT K

The procedure of Example 5 is followed except that 0.50 gms (0.86 milliequiv.) of a 70 weight percent methanolic solution of ethyl triphenyl phosphonium acetate.acetic acid complex is employed as the catalyst. The product analyses are reported in Table IV.

TABLE IV

| Ex. or Comp. Expt. | CATALYST | TARGET EEW | EEW | % of TARGET EEW | Mw | POLYDIS-PERSITY |
|---|---|---|---|---|---|---|
| 5 | tetramethylene bis (triphenyl phosphonium bromide) | 3,500 | 3,549 | 101.4 | 25,252 | 4.14 |
| J* | methylene bis (triphenyl phosphonium bromide) | 3,500 | 4,172 | 119.2 | 47,125 | 6.03 |
| K* | ethyltriphenyl phosphonium acetate.acetic acid complex | 3,500 | 3,233 | 92.37 | 20,761 | 3.69 |

*Not an example of the present invention.

The data in Table IV shows that tetramethylene bis (triphenyl phosphonium bromide), Example 5, is an excellent catalyst for epoxy resin advancement. Targeted EEW is reached even when the reaction is carried out at high temperatures, where conventional catalysts like ethyl triphenyl phosphonium acetate.acetic acid complex, Comp. Expt. K, are prematurely deactivated, resulting in incomplete reaction (lower than targeted EEW). On the other hand, the methylene bis (triphenyl phosphonium bromide) catalyst, Comp. Expt. J, does not become deactivated, resulting in very high EEW, broad M.W. distribution and uncontrollable viscosity build due to continuing side-reactions.

What is claimed is:

1. In a precatalyzed composition comprising a compound having at least one vicinal epoxy group per molecule and a catalyst having two phosphonium groups per molecule; the improvement which comprises employing a catalyst represented by the formula

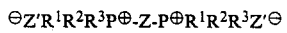

$$\ominus Z' R^1 R^2 R^3 P \oplus -Z-P \oplus R^1 R^2 R^3 Z' \ominus$$

wherein each $R^1$, $R^2$ and $R^3$ is independently an aromatic group or an inertly substituted aromatic group; Z is $-(C(R^4)_2)_a-$; each $R^4$ is independently hydrogen or a hydrocarbyl group containing from 1 to about 20 carbon atoms; Z' is any suitable anion; a has a value of 4 or 5; and wherein the catalyst is present in an amount of from about 0.0005 to about 50 milliequivalents per epoxide equivalent of the epoxy containing compound.

2. A precatalyzed composition of claim 1 wherein each $R_4$ is independently hydrogen or a hydrocarbyl group containing from 1 to about 10 carbon atoms; Z' is a halide, phosphate, bisphenate or a carboxylate.carboxylic acid complex; and the catalyst is present in an amount of from about 0.05 to about 30 milliequivalents per epoxide equivalent of the epoxy containing compound.

3. A precatalyzed composition of claim 2 wherein each $R_4$ is independently hydrogen or a hydrocarbyl group containing from 1 to about 4 carbon atoms; Z' is a halide or phosphate; and the catalyst is present in an amount of from about 0.05 to about 30 milliequivalents per epoxide equivalent of the epoxy containing compound.

4. A precatalyzed composition of claim 3 wherein each $R_4$ is hydrogen; Z' is bromide; and the catalyst is present in an amount of from about 0.5 to about 10 milliequivalents per epoxide equivalent of the epoxy containing compound.

5. A precatalyzed composition of claim 4 wherein said catalyst is tetramethylene bis(triphenyl phosphonium bromide), pentamethylene bis(triphenyl phosphonium bromide), or a combination thereof.

6. A precatalyzed composition of claim 1, 2, 3, 4, or 5 wherein said compound having at least one vicinal epoxy group per molecule is an epoxy resin representated by the following formula

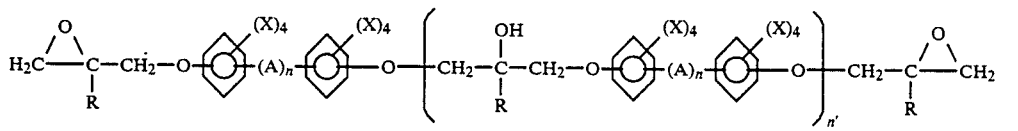

wherein A is a divalent hydrocarbyl group having from 1 to about 12 carbon atoms; each R is independently hydrogen or an alkyl group having from 1 to about 4 carbon atoms; each X is independently hydrogen or a hydrocarbyl or hydrocarbyloxy group having from 1 to about 12 carbon atoms, or a halogen; n has a value of zero or 1 and n' has a value from zero to about 0.5.

7. A precatalyzed composition of claim 6 wherein each R is independently hydrogen or methyl; each X is independently hydrogen or a hydrocarbyl or hydrocarbyloxy group having from 1 to about 6 carbon atoms or a halogen; n has a value of zero or 1 and n' has a value from about 0.1 to about 0.4.

8. A precatalyzed composition of claim 7 wherein each R is hydrogen; each X is independently hydrogen or a hydrocarbyl or hydrocarbyloxy group having from 1 to about 4 carbon atoms, chlorine or bromine; n has a value of 1 and n' has a value from about 0.1 to about 0.3.

9. A precatalyzed composition of claim 8 wherein said compound having at least one vicinal epoxy group per molecule is a diglycidyl ether of bisphenol A.

10. In a process for reacting a compound having at least one vicinal epoxy group per molecule with an acidic compound in the presence of a catalytic quantity of a catalyst containing two phosphonium groups; the improvement which comprises employing a catalyst represented by the formula

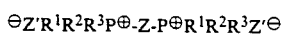

wherein each $R^1$, $R^2$ and $R^3$ is independently an aromatic group or an inertly substituted aromatic group; Z is —$(C(R^4)_2)_a$—; each $R^4$ is independently hydrogen or a hydrocarbyl group containing from 1 to about 20 carbon atoms; Z' is any suitable anion; and a has a value 4 or 5.

11. A process of claim 10 wherein each $R_4$ is independently hydrogen or a hydrocarbyl group containing from 1 to about 10 carbon atoms; Z' is a halide, phosphate, bisphenate or a carboxylate.carboxylic acid complex; and the catalyst is present in an amount of from about 0.0005 to about 50 milliequivalents per epoxide equivalent of the epoxy containing compound.

12. A process of claim 11 wherein each $R_4$ is independently hydrogen or a hydrocarbyl group containing from 1 to about 4 carbon atoms; Z' is a halide or phosphate; and the catalyst is present in an amount of from about 0.05 to about 30 milliequivalents per epoxide equivalent of the epoxy containing compound.

13. A process of claim 12 wherein each $R_4$ is hydrogen; Z' is bromide; and the catalyst is present in an amount of from about 0.5 to about 10 milliequivalents per epoxide equivalent of the epoxy containing compound.

14. A process of claim 13 wherein said catalyst is tetramethylene bis(triphenyl phosphonium bromide), pentamethylene bis(triphenyl phosphonium bromide), or a combination thereof.

15. A process of claim 10, 11, 12, 13, or 14 wherein said compound having at least one vicinal epoxy group per molecule is an epoxy resin represented by the following formula

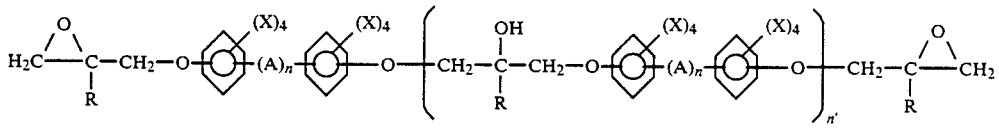

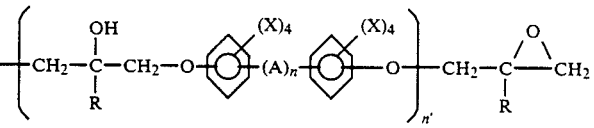

wherein A is a divalent hydrocarbyl group having from 1 to about 12 carbon atoms; each R is independently hydrogen or an alkyl group having from 1 to about 4 carbon atoms; each X is independently hydrogen or a hydrocarbyl or hydrocarbyloxy group having from 1 to about 12 carbon atoms, or a halogen; n has a value of zero or 1 and n' has a value from zero to about 0.5; said acidic compound is a phenolic hydroxyl containing compound represented by the following formula

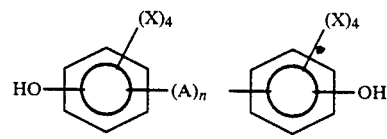

wherein A, X and n is as previously defined.

16. A process of claim 15 wherein each R is independently hydrogen or methyl; each X is independently hydrogen or a hydrocarbyl or hydrocarbyloxy group having from 1 to about 6 carbon atoms or a halogen; n has a value of zero or 1 and n' has a value from about 0.1 to about 0.4.

17. A process of claim 16 wherein each R is hydrogen; each X is independently hydrogen or a hydrocarbyl or hydrocarbyloxy group having from 1 to about 4 carbon atoms, chlorine or bromine; n has a value of 1 and n' has a value from about 0.1 to about 0.3.

18. A process of claim 17 wherein said compound having at least one vicinal epoxy group per molecule is a diglycidyl ether of bisphenol A and said compound having at least one phenolic hydroxyl group per molecule is bisphenol A.

* * * * *